United States Patent
Sullivan

(10) Patent No.: US 6,906,733 B1
(45) Date of Patent: Jun. 14, 2005

(54) METHOD, SIGNAL, SYSTEM, AND INTERFACE FOR DISPLAY WEEK-AT-A-GLANCE PER-NETWORK ELECTRONIC PROGRAM GUIDE GRID

(75) Inventor: Gary E. Sullivan, Mansfield, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/316,250

(22) Filed: May 21, 1999

(51) Int. Cl.[7] .............................................. G06F 13/00
(52) U.S. Cl. ....................................... 345/700; 725/51
(58) Field of Search ................................ 345/700, 716, 345/723, 784; 725/51, 52, 53, 55, 56, 57

(56) References Cited

U.S. PATENT DOCUMENTS

| | | | |
|---|---|---|---|
| 4,115,846 A | | 9/1978 | Laine |
| 4,697,209 A | | 9/1987 | Kiewit et al. |
| 4,706,121 A | | 11/1987 | Young |
| 5,151,789 A | | 9/1992 | Young |
| 4,706,121 A | | 12/1993 | Young |
| 5,353,121 A | | 10/1994 | Young et al. |
| 5,532,754 A | | 7/1996 | Young et al. |
| 5,550,576 A | | 8/1996 | Klosterman |
| 5,559,548 A | | 9/1996 | Davis et al. |
| 5,629,733 A | | 5/1997 | Youman et al. |
| 5,635,978 A | | 6/1997 | Alten et al. |
| 5,686,954 A | | 11/1997 | Yoshinobu et al. |
| 5,699,107 A | | 12/1997 | Lawler et al. |
| 5,732,338 A | | 3/1998 | Schwob |
| 5,751,282 A | | 5/1998 | Girard et al. |
| 5,751,372 A | | 5/1998 | Forson |
| 5,758,257 A | | 5/1998 | Herz et al. |
| 5,760,821 A | | 6/1998 | Ellis et al. |
| 5,801,753 A | | 9/1998 | Eyer et al. |
| 5,801,787 A | | 9/1998 | Schein et al. |
| 5,805,204 A | | 9/1998 | Thompson et al. |
| 5,805,235 A | | 9/1998 | Bedard |
| 5,883,677 A | * | 3/1999 | Hofmann ..................... 348/906 |
| 6,005,631 A | * | 12/1999 | Anderson et al. ........... 348/460 |
| 6,005,861 A | * | 12/1999 | Humpleman ................. 725/37 |
| 6,151,059 A | * | 11/2000 | Schein et al. ................. 348/13 |
| 6,275,989 B1 | * | 8/2001 | Broadwin et al. ............. 725/37 |

* cited by examiner

*Primary Examiner*—Cao (Kevin) Nguyen
(74) *Attorney, Agent, or Firm*—Scott Charles Richardson; Chad W. Swantz; Suiter-West

(57) ABSTRACT

A graphical user interface, system, signal, and software providing an electronic program guide including one or more windows having program scheduling information arranged by a single network. Each network's program scheduling information is accessed through the use of a view list and contains a week's worth of program scheduling information. The program scheduling information is controlled by a single scroll bar and may also provide only information for programs that recur on a periodic basis.

18 Claims, 8 Drawing Sheets

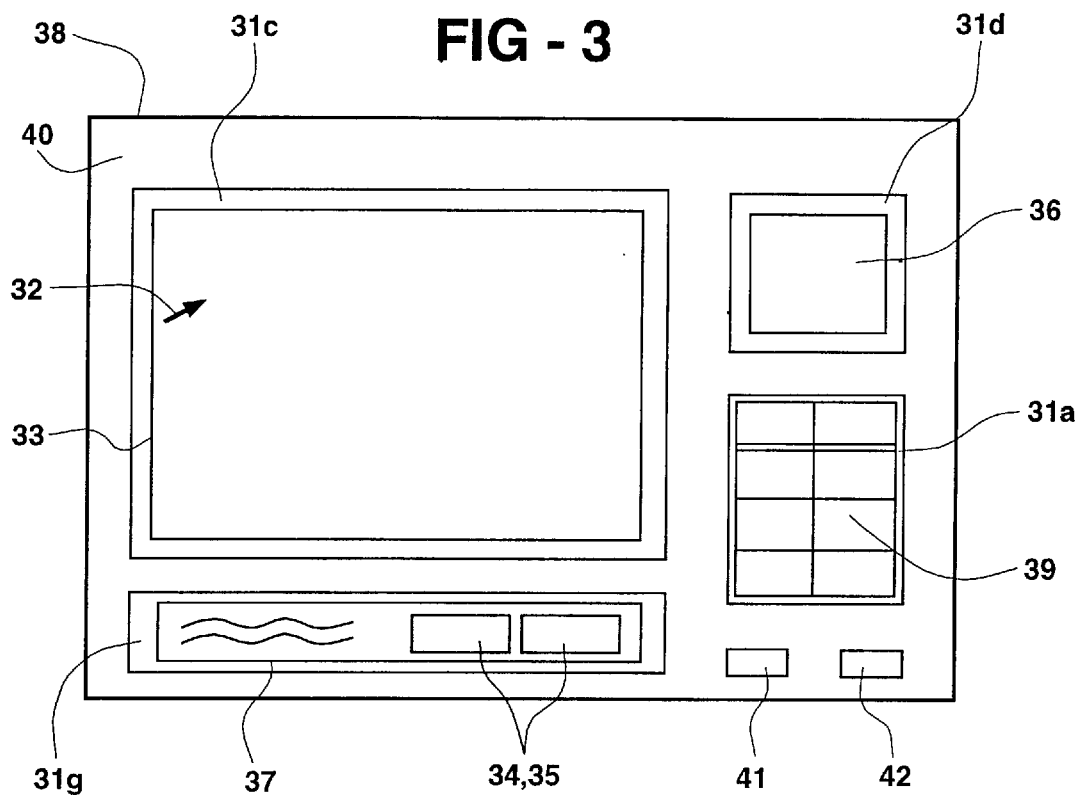
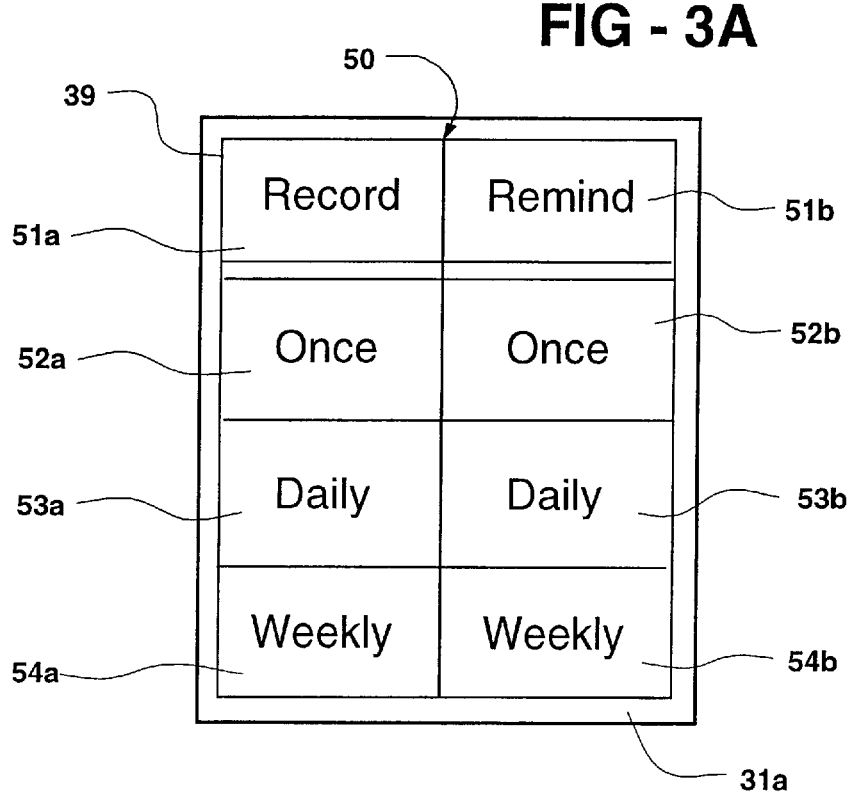

FIG - 3E

| NBC 5 | SAT | SUN | MON | TUE | WED | THUR | FRI |
|---|---|---|---|---|---|---|---|
| | WEEKLY NETWORK AND LOCAL AFFILIATE PROGRAMMING AT-A-GLANCE | | | | | | |
| 5:00PM | | | | | | | |
| 5:30PM | NEWS | NEWS | NEWS | NEWS | NEWS | NEWS | NEWS |
| 6:00PM | | I LOVE LUCY | WHEEL OF FORTUNE | WHEEL OF FORTUNE | WHEEL OF FORTUNE | WHEEL OF FORTUNE | WHEEL OF FORTUNE |
| 6:30PM | | 60 MINUTES | ENTERTAINMENT TONIGHT | ENTERTAINMENT TONIGHT | ENTERTAINMENT TONIGHT | ENTERTAINMENT TONIGHT | AND SO ON.. |
| 7:00PM | 20/20 | | SEINFELD | AND SO ON.. | AND SO ON.. | AND SO ON.. | NBC FRIDAY MOVIE |
| 7:30PM | | | MAD ABOUT YOU | AND SO ON.. | AND SO ON.. | AND SO ON.. | |
| 8:00PM | | NBC SUNDAY NIGHT MOVIE... | OHAMA AND GREG | AND SO ON.. | AND SO ON.. | AND SO ON.. | |
| 8:30PM | | | AND SO ON.. | AND SO ON.. | AND SO ON.. | AND SO ON.. | |

| | 401 | 402 | 403 | 405 | 406 | 407 | 408 | 409 | 410 | 411 | 412 |
|---|---|---|---|---|---|---|---|---|---|---|---|
| CHANNEL | NETWORK | PROGRAM NAME | | DAY | DATE | START TIME | STOP TIME | RATING | RECURS | EPISODE # | EPISODE DESCRIPTION |
| 2 | NBC | FRAZIER | | TUE | 03/18/99 | 20:00 | 22:00 | TVPG | WEEKLY | 990118 | Will Niles regain his condo from... |
| 3 | FOX | SEINFELD | | TUE | 03/18/99 | 21:30 | 22:00 | TVPG | DAILY | 856412 | Jerry dates woman with... |
| 4 | CBS | TURKS | | TUE | 03/18/99 | 20:00 | 21:00 | TVPG | WEEKLY | 96123 | The son of Mike's neighbor is a... |
| 5 | ESPN | THIS WEEK IN GOLF | | TUE | 03/18/99 | 18:00 | 21:00 | N/A | WEEKLY | 678031 | New graphite drivers... |
| 6 | HBO1 | G.I. JANE | | TUE | 03/18/99 | 19:00 | 20:30 | R | N/A | 00001 | Female enlists in the navy... |
| 7 | DISCOVERY | POPULAR SCIENCE | | TUE | 03/18/99 | 17:00 | 18:00 | TVG | MONTHLY | 00046 | Golf clubs with graphite... |
| ... | ... | ... | | ... | ... | ... | ... | ... | ... | ... | ... |
| 2 | ABC | THE HUGHLEYS | | WED | 03/19/99 | 18:00 | 18:30 | TVPG | WEEKLY | 24258 | Darryl worries about his son's... |
| 3 | FOX | SEINFELD | | WED | 03/19/99 | 21:30 | 22:00 | TVPG | DAILY | 856413 | George burns down cabin in... |
| 4 | CBS | JAG | | WED | 03/19/99 | 19:00 | 20:00 | TVPG | WEEKLY | 125974 | An aircraft carrier in a no-fly zone... |
| 5 | ESPN | NHL DET. VS DAL. | | WED | 03/19/99 | 18:00 | 22:30 | N/A | N/A | 981254 | Detroit visits Dallas in a chase... |
| 6 | HBO1 | TITANIC | | WED | 03/19/99 | 16:00 | 19:30 | PG13 | WEEKLY | 00001 | Drama based on a true story... |
| 7 | DISCOVERY | LOST SHIPS | | WED | 03/19/99 | 20:00 | 21:00 | TVG | WEEKLY | 00235 | Locating lost ships in the Atlantic... |
| 8 | CNN | MONEY | | WED | 03/19/99 | 12:00 | 12:10 | N/A | HOURLY | 990319 | Stock Market Update |
| ... | ... | ... | | ... | ... | ... | ... | ... | ... | ... | ... |

FIG - 4

METHOD, SIGNAL, SYSTEM, AND INTERFACE FOR DISPLAY WEEK-AT-A-GLANCE PER-NETWORK ELECTRONIC PROGRAM GUIDE GRID

CROSS REFERENCE TO RELATED APPLICATIONS

FIELD OF THE INVENTION

The present invention relates generally to systems using program scheduling information and, more particularly, to systems, interfaces, software, and signals for providing electronic program guides.

BACKGROUND OF THE INVENTION

Today, the information age is upon us and information is easily accessible to individuals. However, it is the organization of this information that usually defines whether or not it has a basis in practical use. Program information is accessible to individuals through the use of TVs, Convergence PCs, PC/TVs, PCs, or even set top boxes for cable ready TVS, and is organized, many times, in a disorderly manner. Television guides have been used extensively throughout the existence of TVs and have provided the user with information about programs to be aired. The guides are normally printed on a weekly basis and contain program information like the day, date, time, and a brief description of the programs. Additionally, the guides may provide information like whether the program is closed captioned for the hearing impaired or if the program is broadcast with foreign subtitles. In the advent of cable television, paper TV guides have become less desirable due to the fact that different cable companies assign different channel numbers for the same network names. For instance, cable company A provides a cable service with ESPN (ESPN is a trademark of ESPN, Inc.) airing on channel 47, while cable company B provides a cable service with ESPN airing on channel 32. This difference leaves a void in the consistency of assigning channel numbers to the networks aired and thus leaves the consumer at a loss when trying to access the program scheduling information contained in paper-based or printed TV Guides. As a solution, cable companies have provided program guides aired on a specific channel with the guide displaying a list of the channels provided by the cable company and a chronology of current program information for each of the channels.

Program guides currently provided by cable companies possess several intrinsic problems created in the presentation and accessibility of the program information. The guides provide program information in a grid that lists all of the networks by channel number, in several time slots, covering a varying time period. As one can imagine, an EPG may become very lengthy, displaying entries 30 minutes apart for each network. The number of cells required vastly exceeds the amount of room available for displaying the information on a TV or PC monitor. Therefore, the user is left with navigating through an excessive amount of program cells in an effort to locate the desired program information. Often, this leaves the user disoriented with no sense of origin within the guide. Also, current EPGs do not provide user selectable cells allowing easy access to programs being broadcast or to additional information available to the user, such as websites etc.

A further shortcoming of present EPGs is that the user is unable to view the program information for only one network. For example, suppose a user wanted to locate a program airing on "FOX" (FOX is a trademark of $20^{th}$ Century Fox Film Corporation) but was unsure of the date and time the program aired. The user would have to scroll through each of the time slots for all of the networks until the program name appeared in the EPG. This further disorients the user as the user attempts to find the desired program information. Through current guides not providing program information by network and not having a fixed length, like the seven days of a typical TV guide, current program guides fall short of providing the user a non-disorienting guide displaying program information.

Therefore, what is needed is a system, method, interface, software, and signal to display an electronic program guide including program information arranged by network.

SUMMARY OF THE INVENTION

Accordingly, the present invention provides a system comprising at least one processor, memory operably coupled to the processor, a user interface configured to display at least one network program schedule window corresponding to one network from a plurality of networks, the window including program information corresponding to a plurality of programs and user selectable program cells for selecting the programs for viewing.

The present invention also provides a user interface comprising at least one network program schedule window corresponding to one network from a plurality of networks. The network program schedule window includes program information corresponding to a plurality of programs and user selectable program cells for selecting the programs for viewing.

The present invention also provides a computer readable medium tangibly embodying a program of instructions which implements maintaining a user interface configured to display at least one network program schedule window corresponding to one network from a plurality of networks. The network program schedule window includes program information corresponding to a plurality of programs and user selectable program cells for selecting the programs for viewing.

The present invention also provides a method for displaying program information for a single network. The method comprises the steps of selecting a network, accessing program information associated with the network, and displaying the program information in a network program schedule window.

The present invention also provides a signal embodied in a propagation medium where the signal comprises program information arranged by network.

It is an object of the present invention to provide an EPG displaying program information arranged by network.

It is another object of the present invention to reduce the program cells displayed at one time by displaying programming information by network.

It is another object of the present invention to provide a seven-day, 48 one-half-hour-incremented EPG, used to display program information for one network.

It is another object of the present invention to provide an EPG displaying recurring periodic programs.

Another advantage of the present invention is that the user may access information using a single scroll bar.

Another advantage of the present invention is displaying a single network's program scheduling information over a 24-hour period for each day.

Another advantage of the present invention is displaying an EPG of recurring periodic programs.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 3 illustrates a graphical user interface according to the preferred embodiment of the present invention;

FIG. 3A illustrates a display window displaying an event menu according to the preferred embodiment of the present invention;

FIG. 3E illustrates a display window displaying an alternate EPG according to the preferred embodiment of the present invention.

FIG. 4 illustrates program information stored within an EPG database according to a preferred embodiment of the present invention.

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
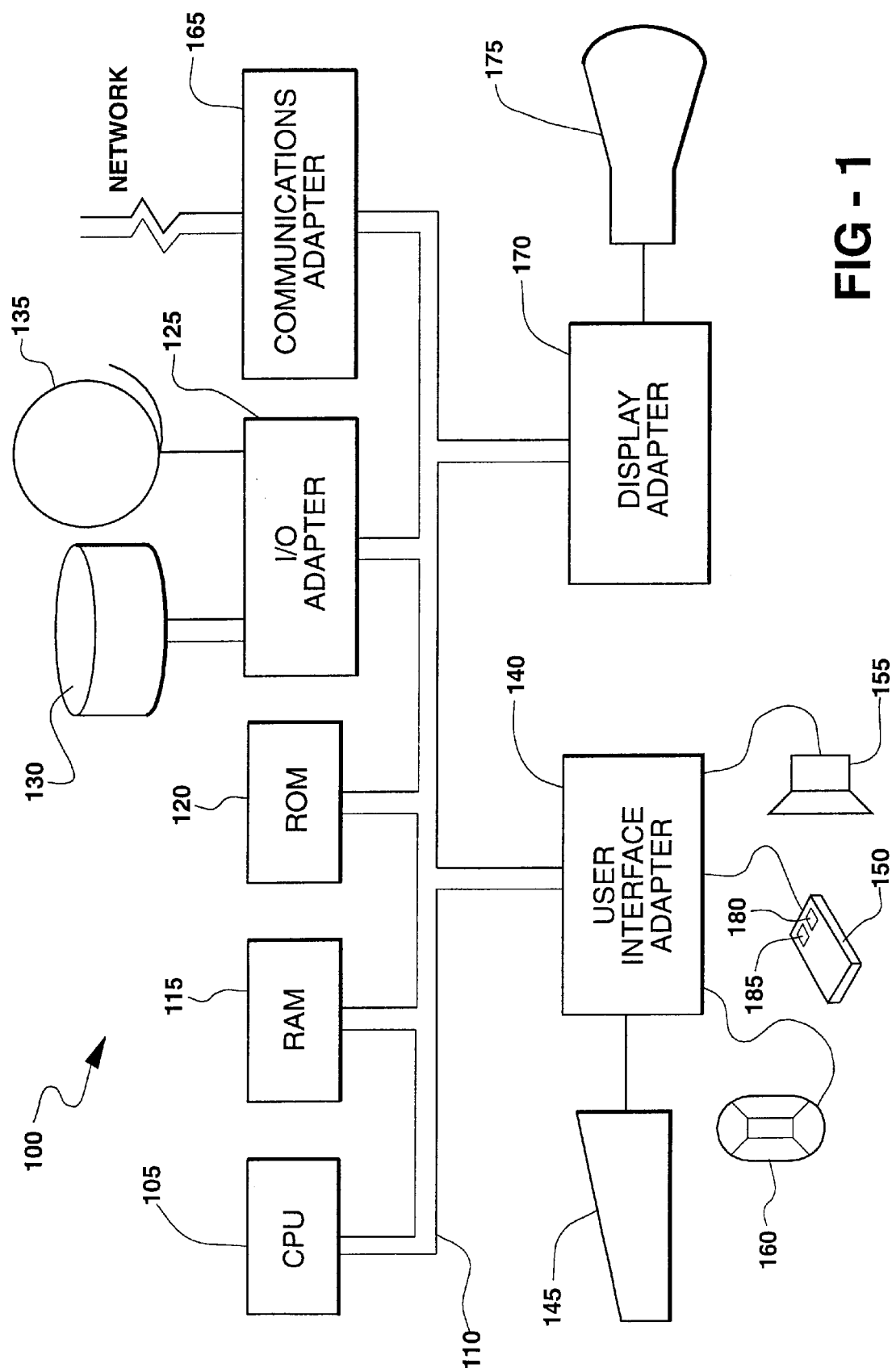
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes random access memory (RAM) 115, read-only memory (ROM) 120 wherein the ROM 120 could also be erasable programmable read-only memory (EPROM) or electrically erasable programmable read-only memory (EEPROM), and input/output (I/O) adapter 125 for connecting peripheral devices such as disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 100 to an information network such as the Internet, and display adapter 170 for connecting system bus 110 to a display device such as monitor 175. Mouse 150 has a series of buttons 180, 185 and is used to control a cursor shown on monitor 175.

Figure 2:
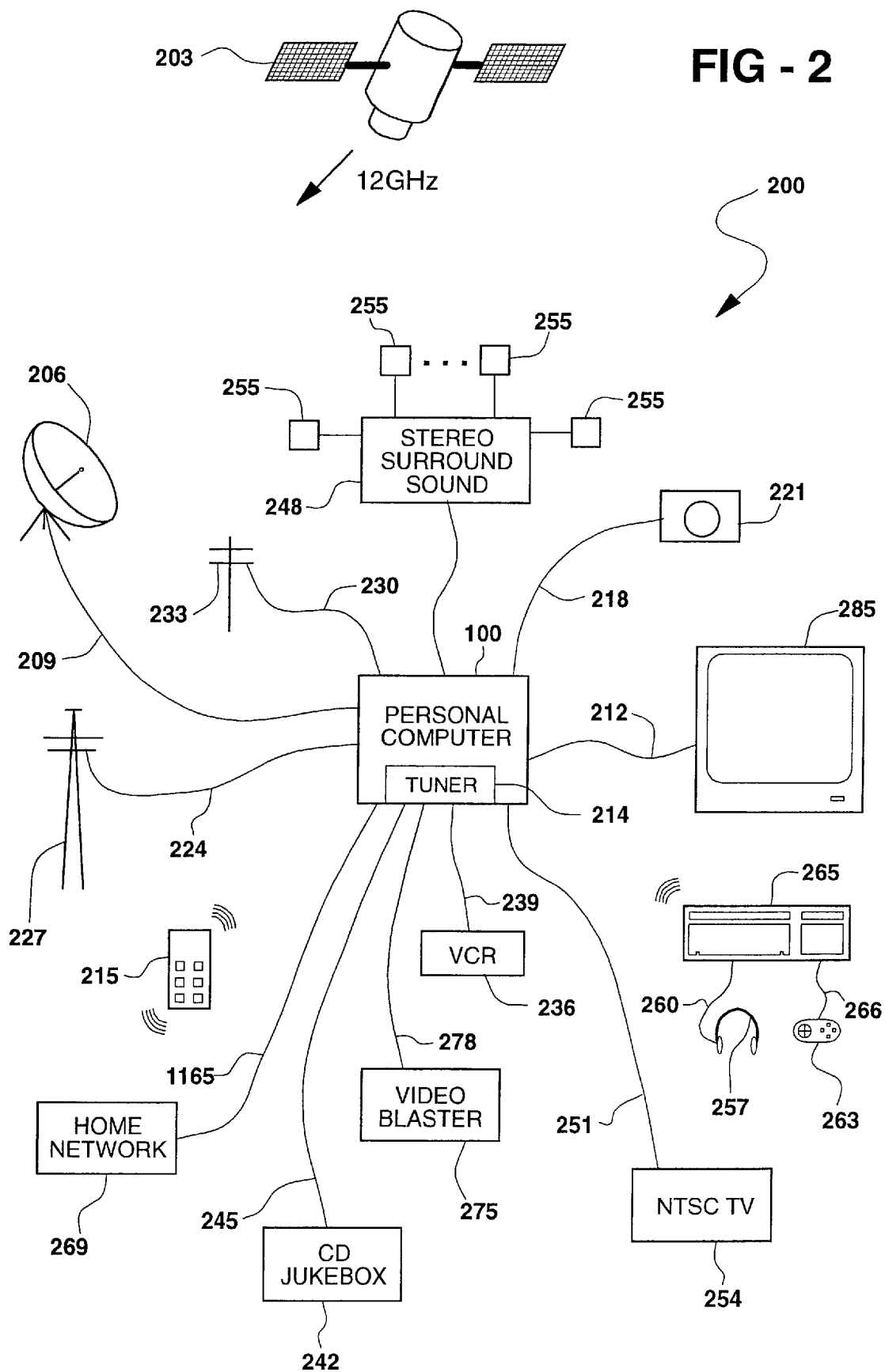
FIG. 2 illustrates a detailed block diagram showing a convergence system according to the preferred embodiment of the present invention.

Referring next to FIG. 2, an integrated home entertainment network or convergence system such as the Gateway Destination System® mentioned above is shown generally at 200. Reference numerals or letters in FIG. 2 which are like, similar, or identical to the reference numerals or letters of FIG. 1 indicate like, similar, or identical components or features. External to convergence system 200 is satellite 203 which, in one preferred embodiment, is a HS601 model operated by Hughes Inc. at a 101 degree west longitude geosynchronous orbital location and transmits signals comprising 150 channels of modulated digital video, audio, and data at a frequency of about 12 GHz. The satellite signals are received by convergence system 200 through antenna 206 containing a low noise block converter amplifier. Antenna 206 is preferably about 18 inches in diameter and receives left- and right-hand circularly polarized signals between 12.2 and 12.7 GHz. Antenna 206 provides a "downconverted-spectrum" signal between 950 and 1450 MHZ via coaxial cable 209 or other suitable communication medium to information handling system 100, such as a personal computer or other system or circuitry capable of processing information. Suitable antennas are manufactured and sold by RCA Corporation® via direct sales and through numerous major retail chains such as Radio Shack®.

Information handling system 100 contains circuitry and software to further process signals from satellite dish 206, generally demodulating and decoding the signal to produce a VGA compatible (video graphics adapter) signal. The VGA output is provided via standard VGA-compatible monitor cable 212 to drive large screen data quality monitor 285 which is suitable for viewing in a family room or entertainment room environment. Information handling system 100 provides for user input by means of first remote control 215 and second or auxiliary remote control 265. Remote control 215 comprises a hand-held size device with standard television controls and a numeric keypad and, in one embodiment, controls for a VCR (video cassette recorder) Remote control 215 provides RF (radio frequency) or IR (infrared) control signals for communication with information handling system 100.

Auxiliary remote control 265 can provide a full functionality personal computer keyboard with additional standard television and VCR controls and a pointing device which is preferably in the form of a touchpad. Auxiliary remote control 265 can also provides RF communication between information handling system 100. RF communication is preferred because RF control allows remote control receiver of information handling system 100 to be in a different room from, for example monitor 285. Therefore, RF communications allow a user to control components within convergence system 200 without having a clear line of sight to the unit receiving input.

In another embodiment, IR control signals can be utilized because of the IR standard circuitry are available at a low cost. Monitor cable 212 can be a standard type cable typically used on VGA display devices and can be comprised of several electrical conductors interfacing with monitor 285 in a D-series shell connector. In one embodiment, full multi-media sourcing and accessing of audio/video/data (A/V/D) broadcast is further provided.

Information handling system 100 may include tuner circuitry 214 capable of tuning multiple channels and receiving television information or signals compatible with NTSC (National Television Standards Committee) or PAL (Phase Alteration Line) forms from any medium such as from a cable system or from a digital satellite system. One embodiment of the signal on coaxial cable 209 from satellite dish 206 provides digital A/V/D signals from such sources as DirecTV or Primestar (DirecTV is a trademark of DirecTV, Inc., and Primestar is a trademark of Primestar Partners, L.P.). In another such embodiment, the signal on coaxial cable 209 provides analog A/V such as a NTSC compatible antenna signals.

In another such embodiment, the signal on camera cable 218 from camera 221 can provide analog A/V such as NTSC audio/video signals. In further embodiments, the signal on cable-data source cable 224 from cable-data source 227 provides analog and/or digital A/V/D. In further such embodiments, the signal on PSTN (Public Switched Telephone Network) cable 230 from PSTN 233 provides data or phone signals such as ISDN (integrated services digital network) or POTS (plain old telephone system) signals. In one set of such embodiments, information handling system 100 is programmed to automatically record analog signals such as television programming onto recordable media such as a videotape in VCR 236 coupled to cable 239. In another such set of embodiments, information handling system 100 is programmed to automatically record digital signals such as digital television programming or CD-ROM (Compact Disk-Read Only Memory) type audio onto recordable media such as recordable CDs in CD jukebox 242 coupled to cable 245. CD jukebox 242 can also play CDs or CD-ROMs for use elsewhere. In another such embodiment, signals are sent to stereo surround sound system 248 for audio output to one or more speakers 255 and on NTSC TV cable 251 to NTSC TV 254. In one embodiment, earphones 257 on earphones' cable 260 and gamepad 263 on gamepad cable 266 provide additional input/output using auxiliary remote control 265. Home network 269 is "smart wiring" used to communicate with the users home, coupled by home network cable 272 to information handling system 100. Videoblaster 275 provides video signal processing utilizing videoblaster cable/connector 278. In one embodiment, cables used within IHS 100 and/or convergence system 200 may be coupled using wiring, IR communications, or RF communications or any combination thereof.

One example of convergence system 200 is the Destination System using the DestiVu user interface manufactured and sold by Gateway 2000, Inc. Convergence system 200 is a fully functional computer integrated with a television (via broadcast, cable, satellite, VCR, digital disk, or other broadcast media) and also provides personal computing functionality. This convergence of computer and television enables a user the combined access to both television programs and information as well as computer related functionality such as computer information, programs, and Internet access.

Although many of today's televisions employ much of the same hardware resources employed by computers such as information handling system 100, it is possible that the present invention might be practiced in other electronic devices or in networked electronic devices. For example, with the development of audio/video networking such as the recently proposed HAVi (Home Audio/Visual interoperability) standard, television sets or other audio/video devices such as audio/video receivers and VCRs that do not themselves contain such resources could implement the present invention by utilizing the resources of other devices on a communication network.

Referring now to FIG. 3, an illustration of a Graphical User Interface (GUI) 38 according to the preferred embodiment of the present invention is shown, wherein reference numerals or letters which are identical to reference numerals or letters in FIGS. 1–2 indicate like, similar, or identical components or features. FIG. 3 illustrates a detailed view of an operating system's GUI as displayed on the display device 175 in accordance with the present invention. The operating system shown in FIG. 3 is DestiVu by Gateway Inc., but the present invention will work with Windows 95, Windows 98 (Windows 98, Windows 98 are trademarks of Microsoft Corporation), or any other GUI. The GUI 38 includes a cursor 32, desktop 40, two icons 41,42, window 31a displaying event menu 39, window 31c with EPG 33, window 31d displaying additional program information, and dialog box 31g displaying user dialog 37 with user response prompts 34, 35 all of which are well known in the art.

Cursor 32 displayed on display device 175 of system 100 can be controlled using mouse 150 and buttons 180,185. In alternate embodiments, cursor 32 may be controlled by remote control device 215, by a user speaking to system 100 via microphone 160 where system 100 contains a program of instructions to recognize speech patterns of a user to control cursor 32. All in all, those skilled in the art can appreciate utilization of cursor 32 being accomplished in a plurality of ways.

Referring next to FIG. 3A, an illustration of an event menu according to the preferred embodiment of the present invention is shown, wherein reference numerals or letters which are identical to reference numerals or letters in FIGS. 1–3, indicate like, similar, or identical components or features. FIG. 3A is an illustration of event menu 39 displayed within window 31a of GUI 38. Event menu 39 may be used to schedule events using a selected program and associated program information.

Event menu 39 includes record and remind events wherein a record event is an event that has a record function associated with the event and a remind event is an event that has a remind function associated with the event. Event menu 39 includes an event header 50 with record and remind title bars 51a, 51b to describe the events within event menu 39. As previously mentioned, a record event is used to record a program and may be accomplished using any type of recording device configured to record a program such as a writeable disk or a VCR 236. A remind event is used to remind the user of a program that is about to air. Several embodiments may include, but are not limited to, an audible tone, an email, a user prompt, or even the replaying of a pre-recorded message played by a player internal to the information handling system 100 and played by a program contained within Windows 95 or any other type of operating system.

The events included within event menu 39 are associated with the event titles in header 50 to include a record or remind once 52a, 52b, a daily record or remind 53a, 53b, and a weekly record or remind 54a, 54b. The recurrence periods of each of the events is indicated by the names of the events. For instance, a weekly remind event 54b has a recurrence period of one week, and a daily record event 53a has a recurrence period of 24 hours. Additionally, the record and remind once events 52a, 52b have no recurrence period as they are performed only one time. FIG. 3A is one graphical representation of event menu 39. In other embodiments event menu 39 may be organized in a plurality of ways such as horizontally (not shown) or through the use of a pull-down function menu (not shown) all of which are well known in the art. It can also be appreciated by those skilled in the art that in other embodiments, event menu 39 may contain a plurality of types of events to be used in association with a program, and therefore, event menu 39 is not limited to record and remind events.

Figure 3B:
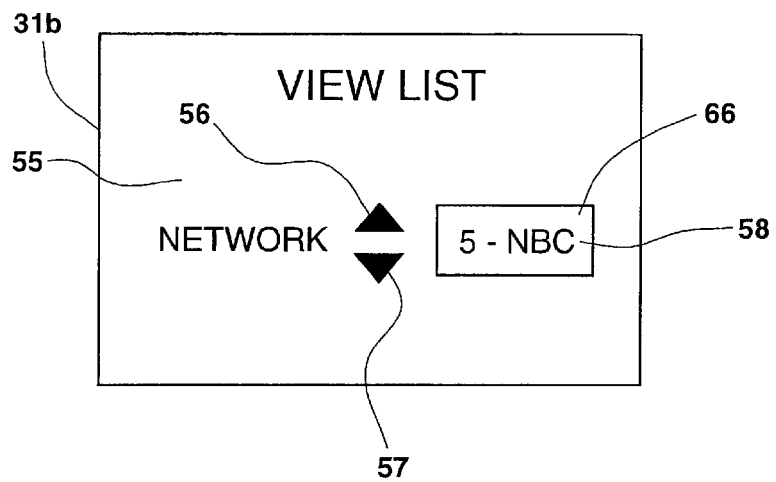
FIG. 3B illustrates a display window displaying a view list according to the preferred embodiment of the present invention.

Referring next to FIG. 3B, an illustration of a view list according to the preferred embodiment of the present invention is shown, wherein reference numerals or letters which are identical to reference numerals or letters in FIGS. 1–3, 3A indicate like, similar, or identical components or features. FIG. 3B is an illustration of a view list 55 displayed within of GUI 38. View list 55 is used to select a single network's EPG. View list 55 displays an information window 66 displaying network channel and name 58 of a single network. Networks are accessible by up and down arrows 56, 57 used to scroll the list of networks included within view list 55. For example, suppose the user wanted to view the EPG for a single network such as NBC, as indicated in window 66. The user would select the up and down arrows 56, 57 using cursor 32 until NBC is selected.

The number of networks and network types included in view list 55 are not limited to atypical cable networks and may include additional networks such as websites that broadcast programs. Such websites, like www.broadcast.com, may be included in the view list for selecting an EPG displaying program information for a website. In the preferred embodiment of the present invention, the overall function of view list 55 is to facilitate the selection of a single network's EPG to be used in displaying program information. The configuration of view list 55 is not shown in a limiting sense, but as one example by which a single network may be selected to display an EPG displaying program information.

Figure 3D:
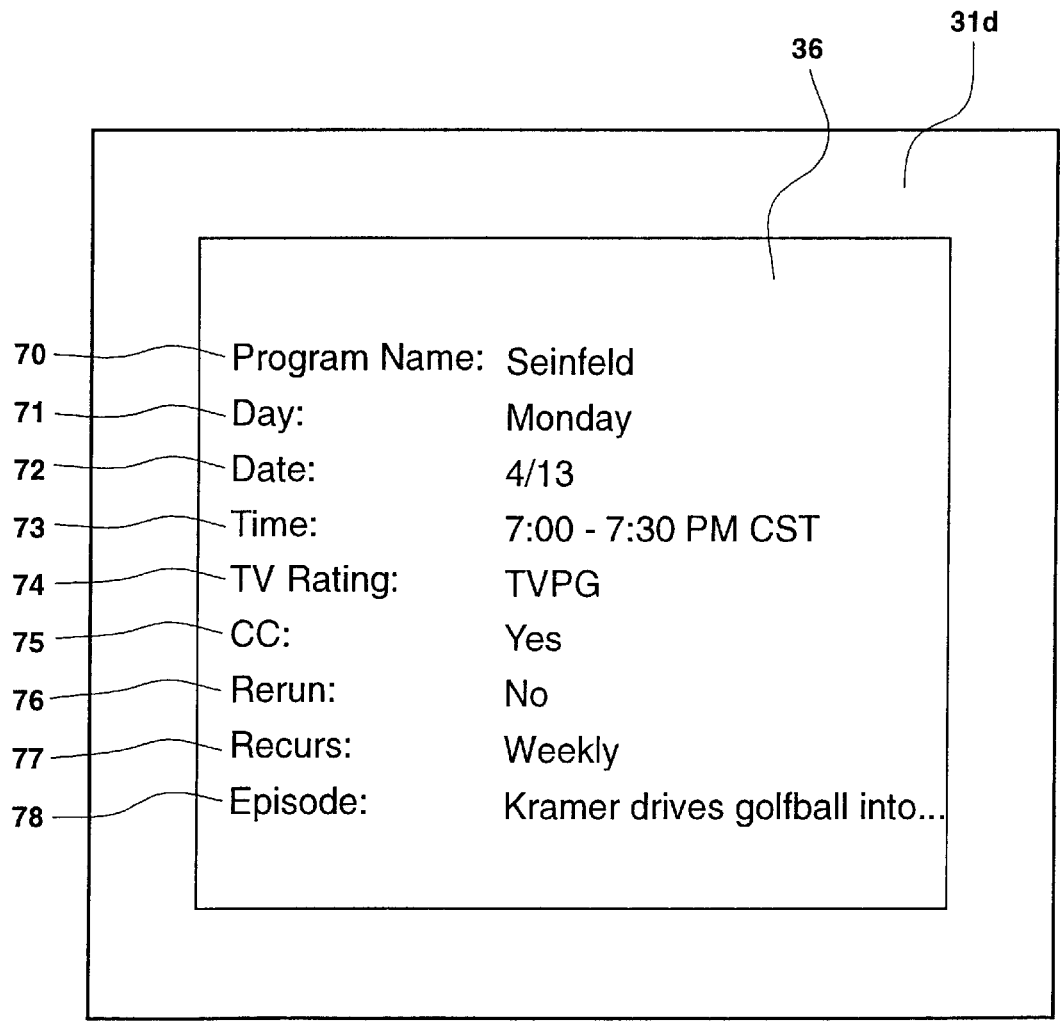
FIG. 3D illustrates a display window displaying program information according to the preferred embodiment of the present invention.
Figure 3C:
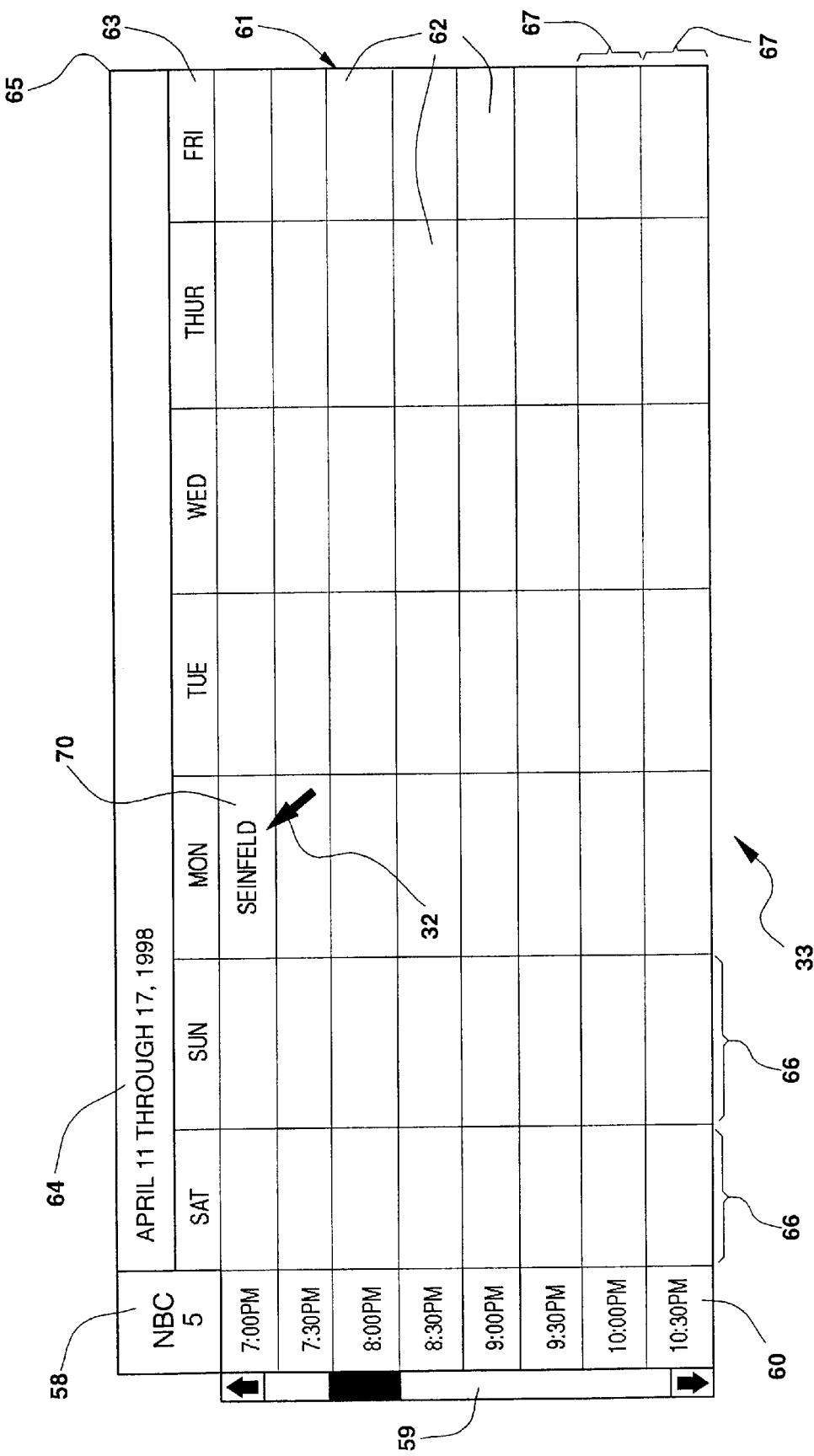
FIG. 3C illustrates a display window displaying an EPG according to the preferred embodiment of the present invention.

Referring next to FIG. 3C, an illustration of an EPG according to the preferred embodiment of the present invention is shown, wherein reference numerals or letters which are identical to reference numerals or letters in FIGS. 1–3, 3B indicate like, similar, or identical components or features. FIG. 3C is an illustration of an EPG 33 displaying program information displayed within window 31c of GUI 38 by display device 175.

EPG 33 displayed within window 31c displays a week of program information for a single network. EPG 33 contains a grid 65 with a header 64 indicating the effective dates of EPG 33 and network name and/or channel number 58. The program information contained within grid 65 is accessed using vertical scroll bar 59 wherein utilization of scroll bars are well known in the art. Also contained within grid 65 is a matrix 61 of cells 62 configured to display program information. In the preferred embodiment, the cells 62 may be selected by cursor 32 using cursor control device such as mouse 150 and mouse buttons 185, 180 or through the use of remote devices 215 or remote device 265. The user selects a program for viewing by selecting the desired cell 62 and/or program name 70 contained within cell 62. Cell 62 contains program name 70, but in other embodiments, cell 62 may contain additional information such as a program rating, closed captioned information, web address information, or no textual information at all. Displaying of textual information within cells 62 and variants thereof are well known in the art.

Grid 65 may be organized in a plurality of ways to display program information, but in the preferred embodiment, grid 65 comprises a matrix 61 with labels 63 for columns 66 indicating the weekday names 63 of the program information displayed therein. The labels for columns 66 are located above matrix 61 in a manner to separate and label each column. Matrix 61 also includes 48 rows 67 identified by 48 time slots 60 labeled one-half hour apart and vertically positioned along the left-hand side of matrix 61 with the top-most label being 12:00 A.M. The 47 other labels increase chronologically in one-half hour increments as EPG 33 is traversed from top to bottom. In the preferred embodiment, time-slots 60 are on the left-hand side of matrix 61 and weekday labels 63 are on the top row of matrix 61. Alternate embodiments of EPG 33 can include labeling the bottom row of matrix 61 with the weekdays and labeling the right-hand side of matrix 61 with 48 time-slots, or any combination thereof Additionally, other time intervals (i.e, 10 minutes, 20 minutes, etc.) for time-slots 60 may be used to configure EPG 33 to any time interval.

In an alternate embodiment of the present invention, the number of columns 66 displayed in EPG 33 varies by the program information available when EPG 33 is configured. For example, suppose only five days of program scheduling information are available when EPG 33 is configured to be displayed. The number of columns 66 in matrix 61 would be reduced to five with the applicable weekday labels 63 being displayed above five columns. Alternatively, suppose there are 14 days of program scheduling information available when EPG 33 is configured. The number of columns 66 would be increased from seven days to 14 days to accommodate the increased amount of program information available. The applicable weekday labels 63 would be displayed above the 14 columns. In both situations, header 64 would reflect the effective date of the program information displayed withing EPG 33.

Upon selecting program name 70 with cursor 32, additional program information associated with the selected program name 70 is displayed as illustrated in FIG. 3D. Referring next to FIG. 3D, an illustration of program information according to a preferred embodiment of the present invention is shown, wherein reference numerals or letters which are identical to reference numerals or letters in FIGS. 1–3, 3A–C indicate like, similar, or identical components or features. FIG. 3D is an illustration of program information contained within window 31d of GUI 38 displayed by display device 175.

The associated program information comprises the program name 70, day 71, date 72, and time 73 of when program name 70 airs. Additional information shown is the rating 74, whether the program is closed captioned for the hearing impaired 75, whether the program 70 has already aired once, making it a rerun 76, and recurrence period 77 of program 70 such as once, daily, weekly, or any periodic interval. The recurrence period shown is the recurrence period for the "Seinfeld" program that airs on a weekly basis and thus has a "weekly" reference for recurrence period 77. Additionally, a daily program would contain a "daily" reference, and a program that airs one time would have a "once" reference for the recurrence period 77. Also shown in the program information is the episode description 78 used to describe the program selected.

The program information need not be displayed in a separate window as illustrated. In alternate embodiments, the information may be contained within the cells of EPG 33 or could be displayed using a pop-up window within GUI 38 or may not be displayed at all. Displaying the program information for the selected program is shown not in a limiting sense but to cite one example of selecting cell 62 and/or a program name 70 within the cells contained in EPG 33. In other embodiments, the selection of a cell 62 may display a multitude of other types of information that may be associated with the selected cell 62 or program name 70.

Referring next to FIG. 3E, an illustration of another EPG according to a preferred embodiment of the present invention is shown, wherein reference numerals or letters which are identical to reference numerals or letters in FIGS. 1–3, 3A–D indicate like, similar, or identical components or features. FIG. 3E is an illustration of another EPG 33' displaying program information displayed within window 31c of GUI 38 by display device 175. EPG 33' is an alternate embodiment of the present invention, and unless otherwise indicated by the following, the configuration of EPG 33' is identical to that of EPG 33 and the variations thereof EPG 33' displays only programs that recur on a periodic basis. For example, the program information for Seinfeld includes a reference to the recurrence period 77 of the program. The recurrence period of the Seinfeld program, being weekly, indicates that the program airs on a weekly periodic basis and would therefore be included in EPG 33'. EPG 33' can be configured to include programs that recur at any periodic internal (i.e., daily, weekly, hourly, etc.) Additionally, in one embodiment of the present invention, EPG 33' can include a reference in header 64' indicating that EPG 33' is a "Network and Local Affiliate Programming At-A-Glance" EPG for a single network. In one embodiment program information associated with the displayed recurring periodic programs would not include an episode description 78, as in FIG. 3D, to describe the upcoming episodes of programs. Therefore, episode description 78 would be left blank due to the program information for the program's not being current program information. EPG 33' provides a user with an EPG of recurring periodic programs to inform the user which programs recur on a periodic basis. EPG 33' further provides the user with a EPG of regularly airing programs when current program information is unavailable to the user.

Referring next to FIG. 4, an illustration of program information stored within an EPG database according to a preferred embodiment of the present invention is shown, wherein reference numerals or letters which are identical to reference numerals or letters in FIGS. 1–3, 3A–E indicate like, similar, or identical components or features. FIG. 4 is a graphical representation of an Electronic Program Guide database. The information illustrated in FIG. 4 is shown generally by EPG database 400 and can be configured in a plurality of ways. Additionally, FIG. 4 is one illustration of program information within an Electronic Program Guide database. The information stored within EPG database 400 can be stored in any format known in the art of storing information within databases.

The information is stored in EPG database 400 can be acquired from any source or any combination of sources. For example, the information stored in EPG database 400 can be acquired through periodic downloads from a cable service provider. In another embodiment, the information stored in EPG database 400 can be acquired by tuning Tuner 214 of FIG. 2 into a certain frequency that transmits information for storage within EPG database 400. In another embodiment, the information stored in EPG database 400 can be acquired by recognizing programs that recur on a periodic basis and identifying a program as a recurring program.

EPG database 400 illustrated in FIG. 4 includes header 415 used to illustrate the types of information that can be stored with an EPG database 400. Header 400 may, or may not, be included in EPG database 400 and is shown only to illustrate the types of program information stored within EPG database 400. The program information can consist of a plurality of types of information associated with a program. Such information can include channels 401, networks 402, program names 403, days 405, dates 406, start times 407, stop times 408, and ratings 409. Database 400 can also contain whether programs recur 410, episode numbers 411, and episode descriptions 412. Additional types of program information may be added to EPG database 400 without departing from the true spirit and scope of the present invention. EPG database 400 is one illustration of program information and contents contained therein and is not shown in a limiting sense, but as one example of program information stored within an Electronic Program Guide database.

Figure 5:
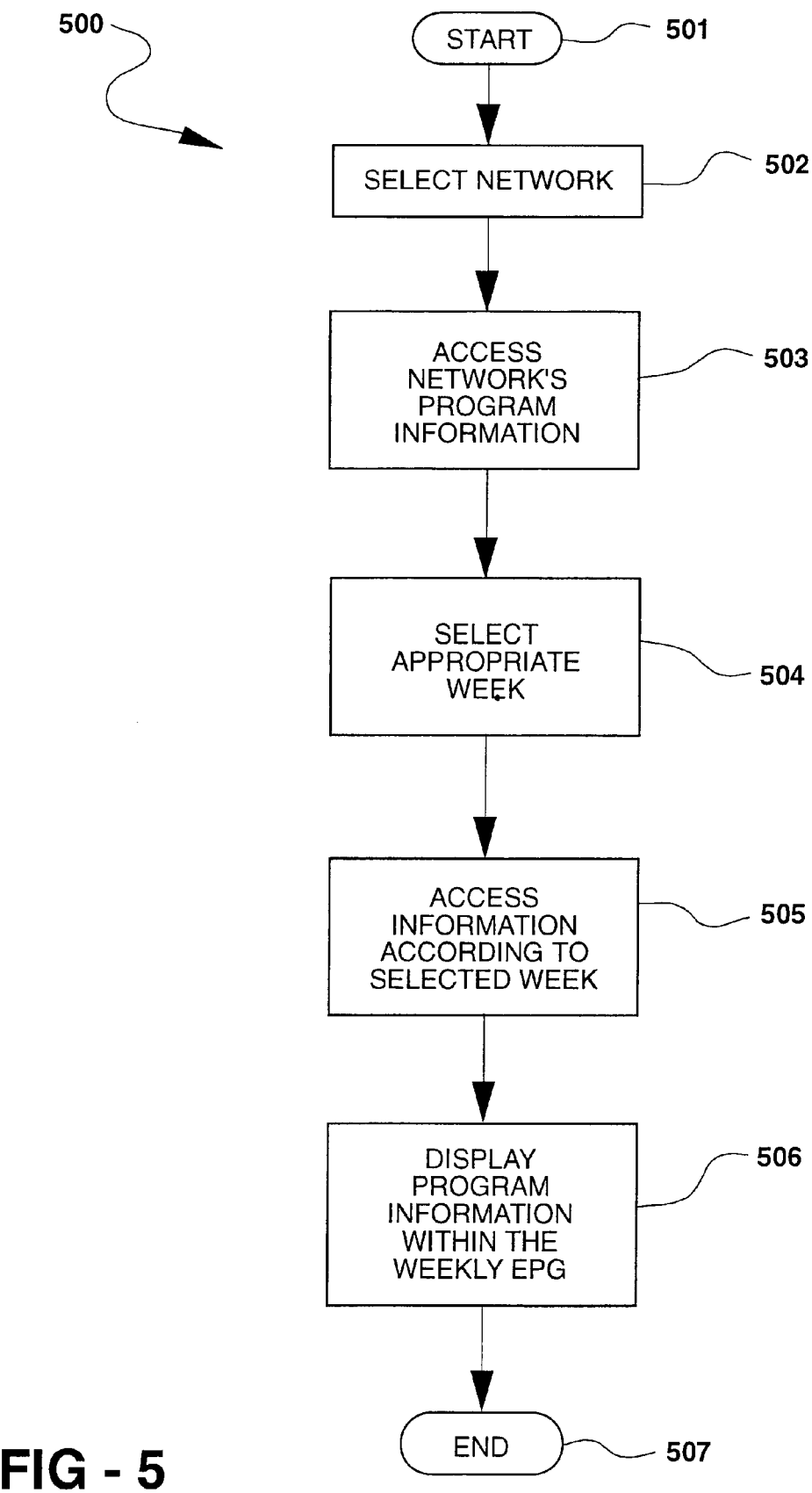
FIG. 5 illustrates a method of displaying program information according to a preferred embodiment of the present invention.

Referring next to FIG. 5, an illustration of a method of displaying program information according to a preferred embodiment of the present invention is shown, wherein reference numerals or letters which are identical to reference numerals or letters in FIGS. 1–4 indicate like, similar, or identical components or features.

FIG. 5 is an illustration of a method for displaying program information within an Electronic Program Guide. In one embodiment the method is used to create the program schedule illustrated in EPG 33 of the FIG. 3E. EPG 33 illustrates one application of the method used to create program schedules and the method is not limited to the creation of the schedule or EPG 33 illustrated in FIG. 3E. Method 500 illustrated in FIG. 5 is used to display a networks weekly program schedule.

Method 500 beings at step 501 and can be initiated by any means. For example, the method can be initiated by a user selecting a network from a view list such as view list 55 of the FIG. 3B. In another embodiment the method can be initiated by a "chron-job", where a "chron-job" is a program that automatically runs at certain times of the day. In another embodiment, the method can be initiated when program information is received by a IHS 100 of FIG. 1 and stored in EPG database 400 of FIG. 4. Therefore, method 500 can be initiated in many ways.

Upon initiation, method 500 begins at block 501. At block 502 a network or channel is selected for accessing program information. For example, if a user selected NBC using view list 55 of FIG. 3B, NBC would be the network selected at block 502. Method 500 would then proceed to block 503 where the method would access the selected network's program information. Access can include identifying a part or all of the program information for a selected network. The method would then proceed to block 504 where an appropriate week is selected. For example, the week could be established from today's date to display this week's program information for a selected network. In one embodiment the appropriate week could be next week's program information for the selected network. Additionally, the method can be used to select information for less than a week or more than a week. In one embodiment, the method can be use all available program information (i.e. 7 days, 9 days, 30 days, etc.) for selecting an appropriate week at block 504.

Upon selecting an appropriate week, the method then proceeds to block 505 where the network's program information for the selected week is accessed. Upon accessing the network's program information for the selected week, the method proceeds to block 506 where the method would display program information within a weekly Electronic Program Guide such as EPG 33 of FIG. 3E. Upon displaying the information, the method then proceeds to block 507 where the method ends.

In one embodiment of the present invention, the program information is not limited to the information previously shown. As can be appreciated by those skilled in the art, the present invention can incorporate a plethora of different types of program information as new types become available. Therefore, the present invention is not limited to the present availability of information types and may be modified to utilize future developed program information types.

In summary, the present invention provides a system, method user interface, and signal for displaying a network's program schedule. The schedule is configured within an EPG and is selectable from a plurality of program networks. The network program schedule includes program information for a plurality of programs for a single network in user selectable cells contained within a matrix with row/column time slots and column/row days. The cells may contain several types of program information and are selectable in many ways for many purposes such as program viewing, hyperlinking, or displaying additional information associated with the program/cell. The program information may also be used to schedule events such as recordings or reminders. The network program schedule can also be configured to display programs that recur on a periodic basis, current program information, or any combination thereof. Further, the network schedule can be configured as an Electronic Program Guide.

Although embodiments of the present invention have been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–5. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog or digital signal, embodied in a propagation medium and transmitted over the propagation medium. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

I claim:

1. A system comprising:
    at least one processor;
    memory operably coupled to said processor; and
    a user interface configured to display at least one network program schedule window corresponding to a single network selected from a plurality of networks, said window including program information corresponding to a plurality of programs of said single network and user selectable program cells for selecting the programs, wherein said single network is selected from a plurality of networks by a user through use of the user interface, and said network program schedule window is displayed as at least one of overlaid separately over a display of said plurality of networks on said user interface and displayed separately from a display of said plurality of networks of said user interface.

2. The system, as defined in claim 1, wherein said user interface further includes a display configured to display a cursor and a cursor control device configured to control said cursor displayed on said display and wherein said cursor control device and said cursor are used to select said user selectable program cells for selecting the programs for viewing.

3. The system, as defined in claim 1, wherein said window is configured to include an electronic program guide (EPG).

4. The system, as defined in claim 1, wherein said program information includes program information within an electronic program guide database.

5. A user interface configured to display:
    at least one network program schedule window corresponding to a single network selected from a plurality of networks, said window including program information corresponding to a plurality of programs and user selectable program cells for selecting the programs for viewing, wherein said single network is selected from a plurality of networks by a user through use of the user interface, and said network program schedule window is displayed as at least one of overlaid separately over a display of said plurality of networks on said user interface and displayed separately from a display of said plurality of networks of said user interface.

6. The user interface, as defined in claim 5, further configured to include a display configured to display a cursor and a cursor control device configured to control said cursor displayed on said display and wherein said cursor control device and said cursor are used to select said user selectable program cells for selecting the programs for viewing.

7. The user interface, as defined in claim 5, wherein said window is configured to include an electronic program guide (EPG).

8. The user interface, as defined in claim 5, wherein said program information includes program information within an electronic program guide database.

9. The user interface, as defined in claim 5, wherein said plurality of program includes only recurring periodic programs.

10. A computer readable medium tangibly embodying a program of instructions, the program of instruction comprising:
    instructions configured to maintain an user interface configured to display at least one network program schedule window corresponding to a single network selected from a plurality of networks, the window including program information corresponding to a plurality of programs and user selectable program cells for selecting the programs for viewing, wherein said single network is selected from a plurality of networks by a user through use of the user interface, and said network program schedule window displayed as at least one of overlaid separately over a display of said plurality of networks on said user interface and displayed separately from a display of said plurality of networks of said user interface.

11. The computer readable medium, as defined in claim 10, wherein the user interface further includes a display configured to display a cursor and a cursor control device configured to control the cursor displayed on the display and wherein the cursor control device and the cursor are used to select the user selectable program cells for selecting the programs for viewing.

12. The computer readable medium, as defined in claim 10, wherein the window is configured to include an electronic program guide (EPG).

13. The computer readable medium, as defined in claim 10, wherein the program information includes program information within an electronic program guide database.

14. A method, for displaying program information for a single network, said method comprising the steps of:
   selecting a single network from a display of a plurality of selectable networks;
   accessing program information associated with the single network; and
   displaying the program information in a network program schedule window, the window including program information corresponding to a plurality of programs and user selectable program cells for selecting the programs for viewing, wherein said single network is selected from a plurality of networks by a user through use of the user interface, and said network program schedule window is displayed as at least one of overlaid separately over a display of said plurality of networks on said user interface and displayed separately from a display of said plurality of networks of said user interface.

15. The method, as recited in claim 14, where the step of selecting includes selecting a period to be used in association with the selected network.

16. The method, as recited in claim 15, wherein the step of accessing further includes accessing the program information associated with the network and the selected period.

17. The method, as recited in claim 14, wherein the step of displaying further includes displaying within an electronic program guide.

18. A computer readable medium tangibly embodying a program of instructions, the program of instruction comprising:
   instructions configured to maintain an user interface configured to display at least one network program schedule window corresponding to a single network selected from a plurality of networks, the window including program information corresponding to a plurality of programs and user selectable program cells for selecting the programs for viewing, the window including a seven-day schedule of program information of said single network, wherein said single network is selected from a plurality of networks by a user through use of the user interface, and said network program schedule window is displayed as at least one of overlaid separately over a display of said plurality of networks on said user interface and displayed separately from a display of said plurality of networks of said user interface.

* * * * *